No. 724,450. PATENTED APR. 7, 1903.
W. N. DUMARESQ.
VARIABLE SPEED GEAR.
APPLICATION FILED AUG. 2, 1902.
NO MODEL. 7 SHEETS—SHEET 1.

WITNESSES
M. J. Dixon
W. R. Berry

INVENTOR:
William Newton Dumaresq
by Henry H. Bates
Attorney.

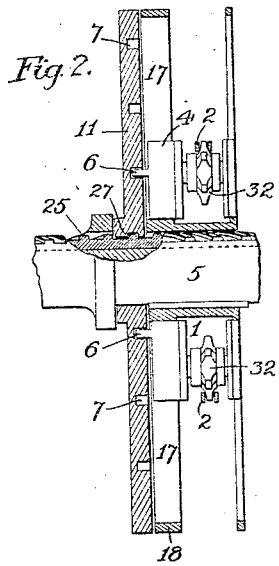
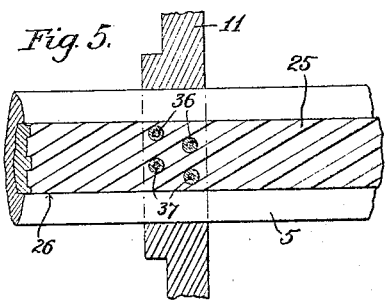
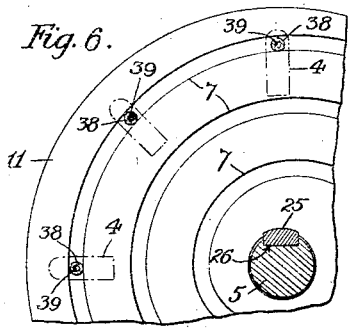

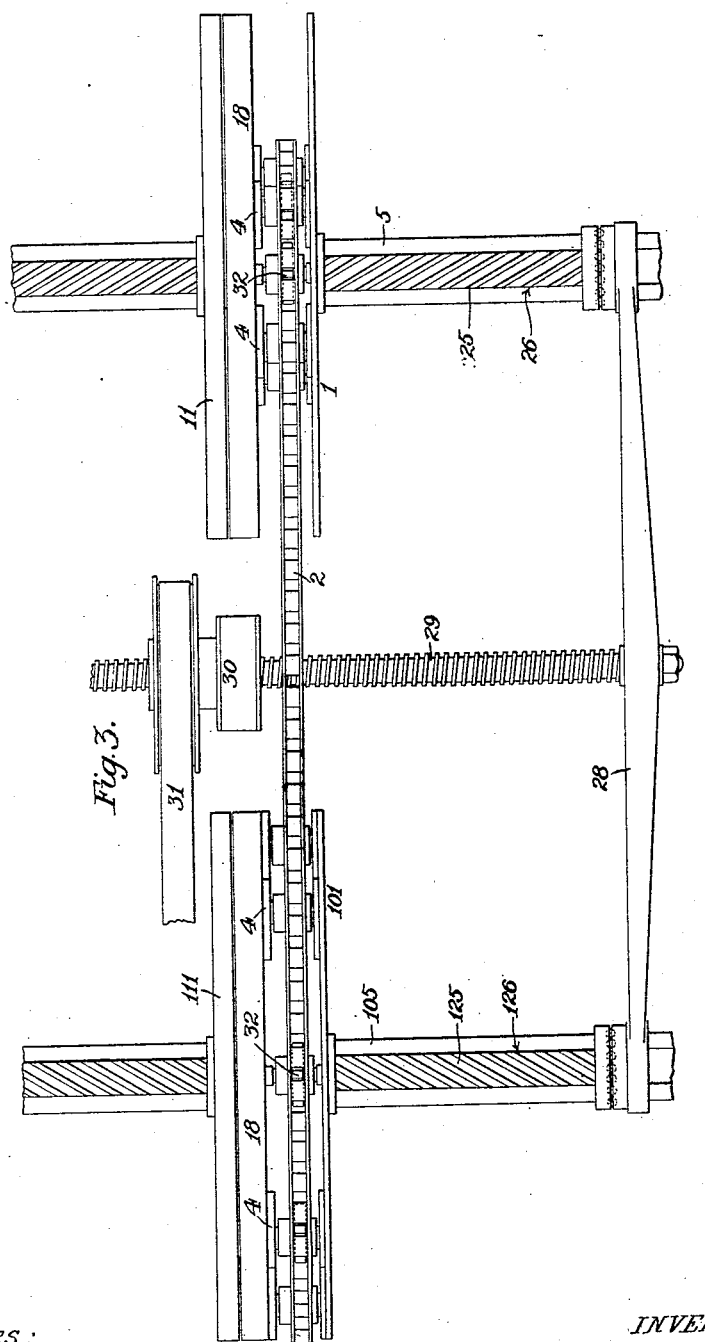

No. 724,450. PATENTED APR. 7, 1903.
W. N. DUMARESQ.
VARIABLE SPEED GEAR.
APPLICATION FILED AUG. 2, 1902.
NO MODEL. 7 SHEETS—SHEET 4.
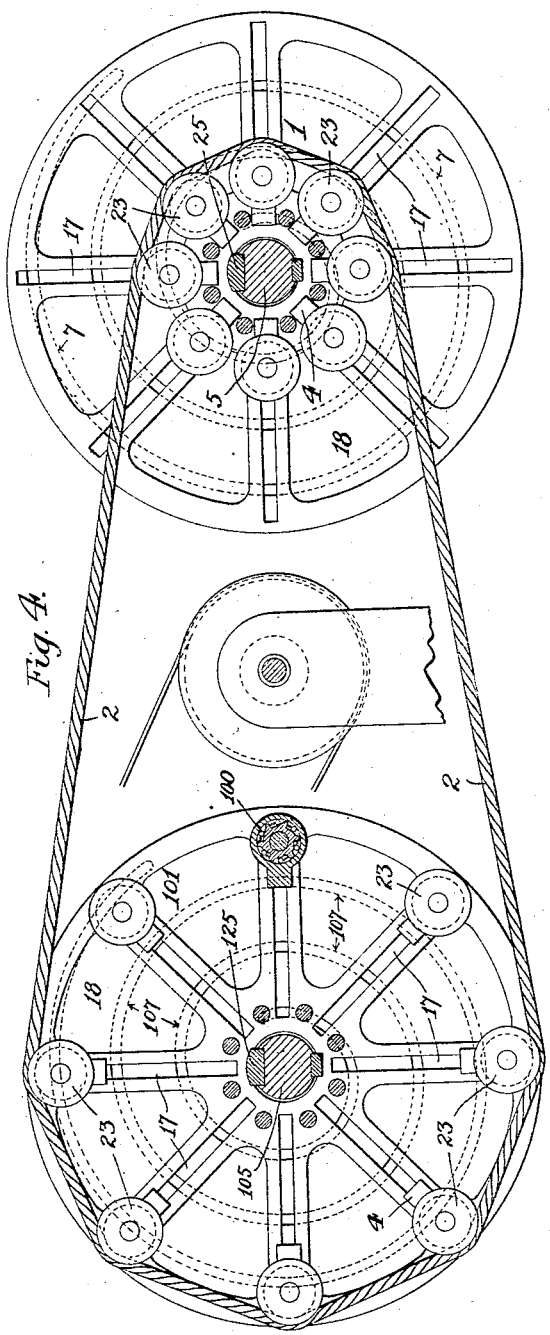
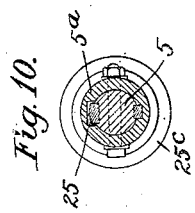
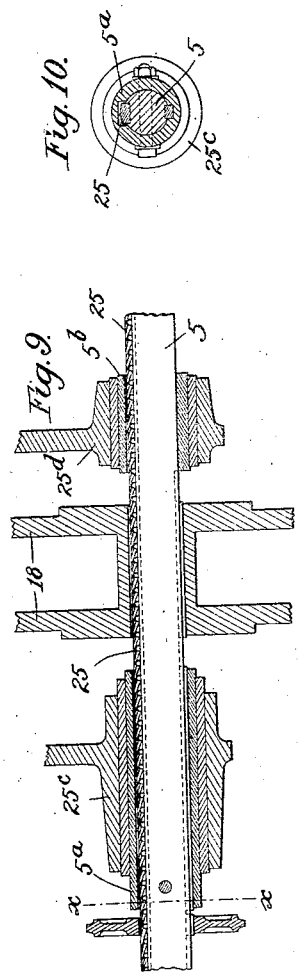
Witnesses.
M. J. Dixon
W. R. Berry
Inventor:
Wm N. Dumaresq
by Henry H. Bates
atty.

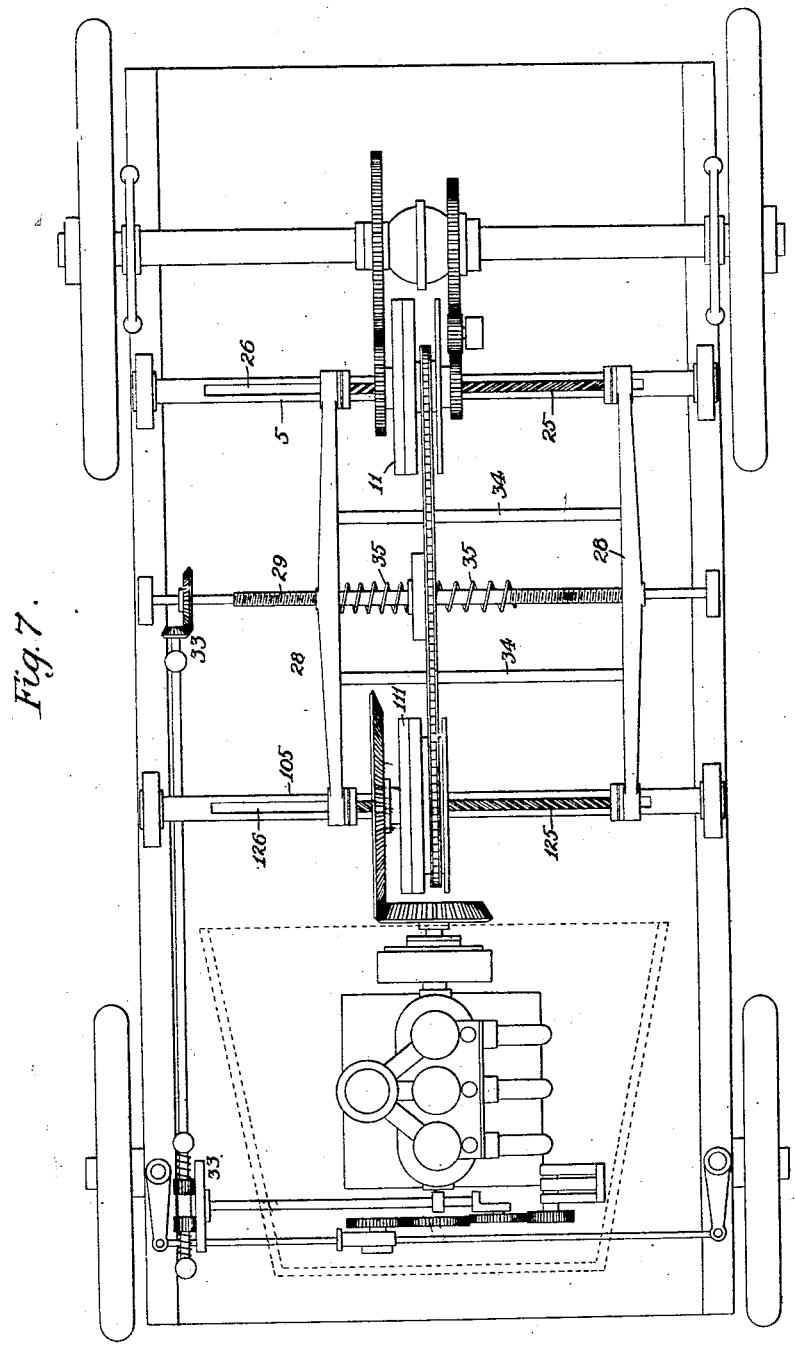

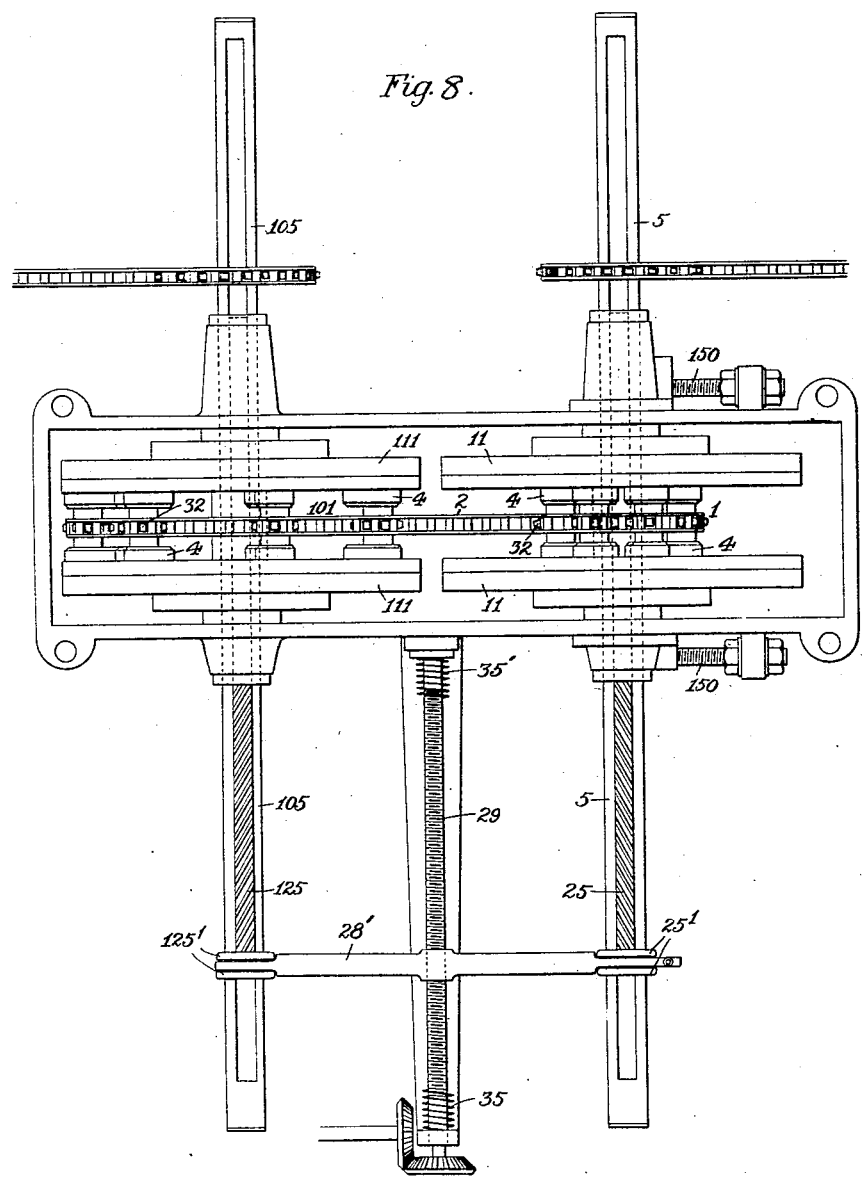

No. 724,450. PATENTED APR. 7, 1903.
W. N. DUMARESQ.
VARIABLE SPEED GEAR.
APPLICATION FILED AUG. 2, 1902.
NO MODEL. 7 SHEETS—SHEET 7.

WITNESSES:
M. J. Dixon
W. R. Berry

INVENTOR:
William Newton Dumaresq
by Henry H. Patin
Attorney.

UNITED STATES PATENT OFFICE.

WILLIAM NEWTON DUMARESQ, OF LONDON, ENGLAND.

VARIABLE-SPEED GEAR.

SPECIFICATION forming part of Letters Patent No. 724,450, dated April 7, 1903.

Application filed August 2, 1902. Serial No. 118,175. (No model.)

*To all whom it may concern:*

Be it known that I, WILLIAM NEWTON DUMARESQ, a subject of the King of Great Britain, residing at 12 Rylett Crescent, Shepherds Bush, London, in the county of Middlesex, England, have invented new and useful Improvements in Variable-Speed Gear, of which the following is a specification.

The object of the present invention is to provide an improved means for operating that class of variable-speed gear consisting in drums having a series of bearings each carrying sprocket-wheels or pulley-wheels which are capable of being moved toward or away from the center and over which the transmission chain or cord passes.

In order that my invention may be fully understood, I will proceed to describe the same by the aid of the accompanying drawings, in which—

Figure 1:
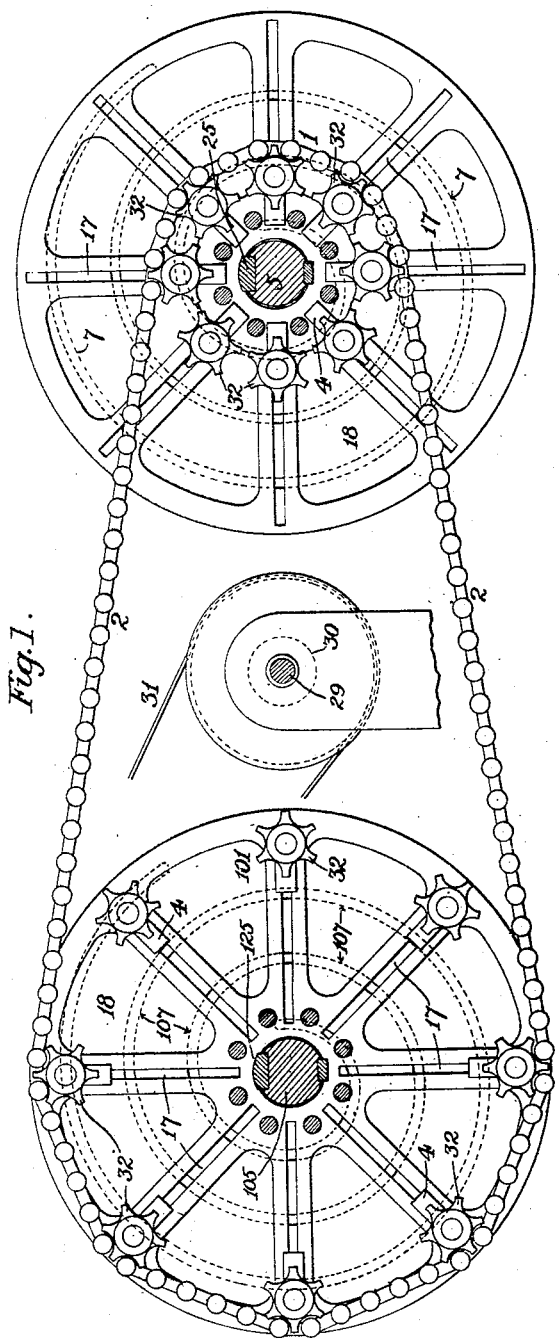
Figure 11:
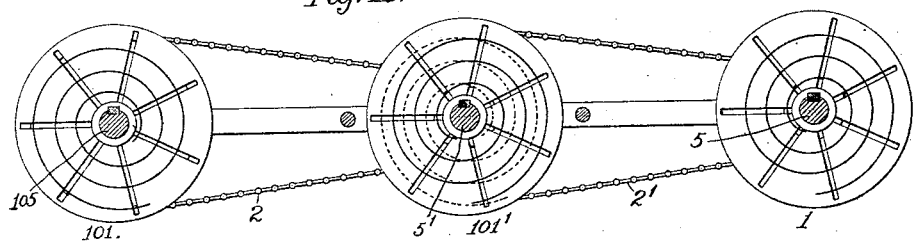
Figure 12:
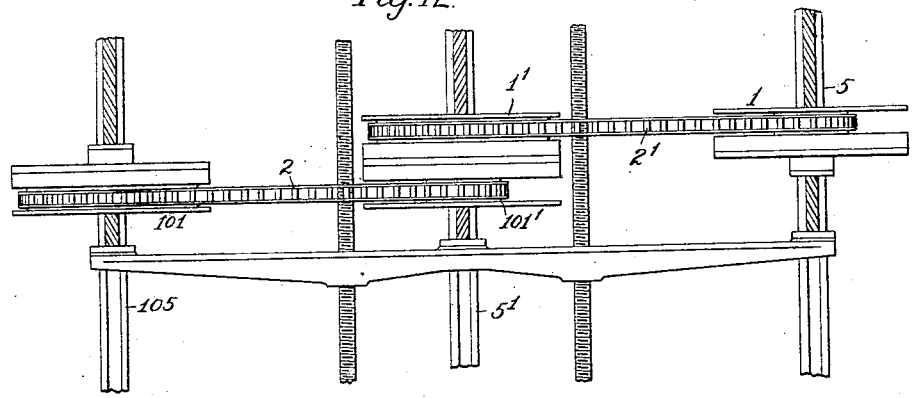
Figure 13:
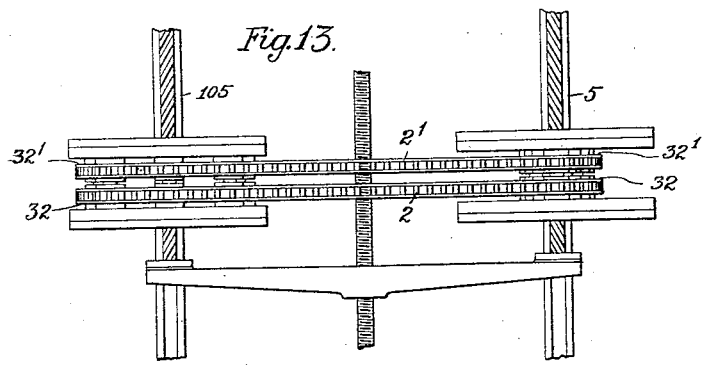

Figure 1 is a side elevation of the device, showing the arrangement for varying the drums simultaneously, of which Fig. 2 is a transverse section, and Fig. 3 is a plan view.
Fig. 4 is a similar view to Fig. 1, but shows the application of the invention in the case when pulley-wheels are carried by the bearings on the drums instead of sprocket-wheels, as shown in Figs. 1, 2, and 3. Fig. 5 is a plan view showing in detail suitable means for reducing friction when expanding and contracting the wheels over which the transmission chain or cord passes. Fig. 6 is an end elevation, also showing in detail means for reducing friction when the drum or drums over which the transmission chain or cord passes is or are contracted or expanded. Fig. 7 is a plan view of a motor-car, showing the arrangement for expanding and contracting the transmission-drums simultaneously. Fig. 8 is a plan view of the gearing of a motor-car, showing a modified arrangement in which the power from the motor to the chain-wheel is transmitted by chain-gearing instead of cord-gearing, as shown in Fig. 7, and the spindles carrying the sprockets or the pulleys are acted upon by the expanding means at both ends, said figure further showing a gear-case for inclosing the expanding drums or wheels. Fig. 9 is a longitudinal section taken through the bearings of one of the shafts in which the racks work, and Fig. 10 is a transverse section of Fig. 9 on the line *x x*. Fig. 11 is a side elevation, and Fig. 12 is a plan view, showing the employment of an intermediate shaft between the driving-shaft carrying one drum and the driven shaft carrying the other drum, all three shafts being provided with expanding drums with the object of further increasing the ratio of speed between the driving and the driven shafts when it is not convenient or practical to effect the desired increase directly from one shaft to the other. Fig. 13 is a plan view of the driving and driven shafts, showing the same fitted with a duplicate set of expanding drums and transmission chains or cords with the object of enabling the direction of rotation to be reversed.

The class of variable-speed gear in connection with which the present invention is to be used comprises a pair of drums 101 and 1, the former on the driving-wheel axis 105 and the latter on the driven-wheel axis 5, each of such drums being composed of a series of pulleys 23, as shown in Fig. 4, or sprocket-wheels 32, as shown in the other figures of the drawings. These pulleys 23 or sprockets 32 are carried by bearings 4, capable of sliding in slots 17, formed in plates 18, secured to the respective axles, and are normally locked by means of a roller-clutch (shown at 100 in Fig. 4) or in any other suitable manner, so that they cannot rotate on their axes, but are simply carried around by the part in which they are mounted. The bearings 4 are provided with members or pins 6, which engage the scroll-thread 7, formed in a plate or plates 11, mounted so as to normally rotate with the different pulleys 23 or sprockets 32, but which when actuated independently of the drum 1 or 101 cause the bearings 4, carrying such wheels, to move inward or outward, according to the direction in which such scroll-thread 7 is rotated, the roller-clutch on which each pulley-wheel or sprocket-wheel is mounted permitting the same to adjust itself during such movement to the transmission cord or chain 2 passing over it. The power for moving the bearings 4, carrying the spindles of the said wheels inward or outward, may be applied either to one end only of such spindles, as are shown in Figs. 3, 4, 7, and 12, where a single scroll-thread plate is employed, or a scroll-thread plate 11 111 may be mounted on each side thereof, as shown in Figs. 8 and 13, so that the power will be applied to both ends of such spindles.

The present invention relates to means for operating the scroll-thread plate or plates.

Figs. 1, 2, 3, 4, 5, 6, and 7 illustrate a suitable arrangement for simultaneously expanding one drum and contracting the other which is applicable when a long shaft can be employed. This arrangement consists in the employment of two racks 125 25, with teeth slanting in opposite directions and each mounted, respectively, in a longitudinal slot 126 26, formed in the driving-shaft 105 and the driven shaft 5, such racks engaging teeth 127 27, formed in the bosses of the scroll-plates 111 11. These two toothed racks 125 25 may be simultaneously actuated in either direction by means of a bar 28, secured to a screw 29, working through a nut 30, which can, as shown, be actuated from the motor-shaft by a cord or belt 31, so as to rotate in either direction, and thus impart the necessary movement in the required direction to such racks, and thereby simultaneously rotate the two scroll-threads 7 in opposite directions, and so expand one of the drums 101 1 and contract the other without interfering with the transmission of motion from the driving-shaft 105 to the driven shaft 5. The screw 29, working through the nut 30, actuated from the motor-shaft, will carry a bar 28 at each end, each one bearing on the opposite ends of the two racks 125 25 for actuating the scroll-plates 111 11, so as to move the latter in opposite directions, according to the direction of travel of the screw.

For the purpose of arresting the travel of the racks 125 25 in either direction when the bearings 4 have been moved to the limit of their outward or inward movement I may employ the arrangement shown in Fig. 7, in which when desired the screw 29 is caused to rotate in either direction from the motor-shaft through suitable gearing 33, said screw working through nuts formed in each of the cross-bars 28 28, which are connected together by connecting-rods 34 34, so as to move together simultaneously in the same direction. A part of screw 29 is left plain at each end and also at the center, so that the bars work off the screw-threaded part at the limit of their movement in either direction. In this movement one or other of the bars is brought into contact with a spring 35 35, which enables the nuts of the disengaged bars to reengage the screw 29 when the latter is rotated in the reverse direction.

For the purpose of diminishing the friction between the racks 125 25 and the teeth 127 27 of the scroll-plates 111 11 I preferably, as shown in Fig. 5, make the latter in the form of antifriction-rollers 36, which are capable of rotating freely on pins 37, mounted in the boss of such scroll-plates. Similarly, as shown in Fig. 6, the friction between the scroll-thread 7 and the projections 6 on the expanding bearings 4 engaging therewith may be reduced by making such projections in the form of antifriction-rollers 38 capable of rotating freely on pins 39.

In the modified arrangement shown in Fig. 8 the screw 29' is arranged on one side only of the expanding drums and carries a single bar 28', bearing on one end of each of the sliding racks 125 25, the latter being acted upon by springs 35' on opposite sides of such bar 28' and (when compressed) one tending to force same in one direction and the other in the opposite direction, so as to cause the nut of the bar to reëngage the screw 29' after same has traveled to the limit of its travel in either direction as soon as the screw is rotated in the reverse direction. The racks 25 125 are only long enough to just engage the teeth 127 27 of the scroll-plates 111 11, respectively, when the sliding racks 125 25 are at the limit of their travel in the opposite directions. The opposite ends of the bar 28 engage between collars 125' 25', formed on the sliding racks 125 25, so as to move the latter with it in either direction without interfering with their free rotation. The bearings of the shafts in which the sliding racks 125 25 are mounted are bushed, such bushes being capable of rotating in the bearings with the shafts and being formed with a groove to permit of the sliding movement of such racks. This arrangement is shown in section in Figs. 9 and 10, where it will be seen that the shaft 5, in which rack 25 slides, passes through sleeves 5ª 5ᵇ, which are secured thereto so as to revolve with the same in the bearings 25ᶜ 25ᵈ. One of the sleeves is removably secured to the shaft 5 for the purpose of enabling the expanding and transmission mechanism to be placed upon and removed from said shaft. The shaft 105 is similarly mounted in sleeves capable of revolving with it in the bearings of said shaft. The screws 150 150 permit of the adjustment of the bearings of shaft 5, so as to take up the slack of the transmission-chain 2. It will be seen that in this arrangement the bearings 4, carrying the spindles on which the sprockets 32 are mounted, are acted upon at both ends by the expanding mechanism instead of at one end only, as illustrated in the previous figures.

Figs. 11 and 12 illustrate an arrangement whereby when it is not practical to provide for the desired range in the ratio of speed between the driving and driven shafts directly from one shaft to another this can be effected by employing an intermediate shaft 5'. The drum 101 on shaft 105 through chain 2 transmits motion to drum 101' on shaft 5', which also carries a drum 1', which in its turn through chain 2' transmits motion to drum 1 on the driven shaft 5. It will thus be seen that by suitably expanding or contracting the different drums in the manner hereinbefore described the ratio of speed between shafts 105 and 5 can be varied within very large limits. In Fig. 11 of the drawings the scroll-threads of the different drums are shown diagrammatically by a single line. It will be further understood that a still wider range in the ratio of speed between such shafts might be provided for by employing two or more intermediate shafts.

Fig. 13 illustrates an arrangement which permits of the driven shaft 5 being driven in either direction, and it consists in employing a duplicate arrangement of sprockets 32 32' both on the driving-shaft 105 and on the driven shaft 5, the whole of such sprockets being connected to their respective spindles by roller-clutches, one set, 32, so that they grip their spindles in one direction and remain free in the opposite direction, while the other set, 32', similarly grip their spindles in one direction and are free in the other, but in the opposite directions to the set 32. It will thus be seen that when set 32 is free the set 32' grip their spindles, and vice versa, so that according to the direction in which driving-shaft 105 is caused to revolve so will motion be imparted through chain 2 or 2' to the driven shaft 5 in one or other direction.

What I claim as my invention, and desire to secure by Letters Patent, is—

1. In variable-speed gear, in combination with a driving-shaft, a driven shaft, drums mounted thereon having expansible peripheries consisting of radially-movable wheels with means for simultaneously varying the dimensions of said peripheries while in motion, and flexible driving means connecting the drums; racks mounted to slide longitudinally in slots in the respective shafts of said drums, obliquely-toothed, internally-toothed wheels or disks loosely mounted on said shafts, in engagement with said rack-teeth, said disks being in operative connection with the means for varying the dimensions of the drum peripheries, and means for longitudinally moving said racks while the shafts are in rotation, whereby the dimensions of the drums are varied simultaneously to vary the speed between the driving and the driven shafts at will, substantially as specified.

2. In variable-speed gear, in combination with a driving-shaft, a driven shaft, drums mounted thereon having expansible peripheries consisting of radially-movable wheels with means for simultaneously varying the dimensions of said peripheries while in motion, and flexible driving means connecting the drums; racks mounted to slide longitudinally in slots in the respective shafts of the said drums, obliquely-toothed, internally-toothed wheels or disks loosely mounted on said shafts, in engagement with said rack-teeth, said disks being in operative connection with the means for varying the dimensions of the drum peripheries, and means for longitudinally moving said racks while the shafts are in rotation, consisting of a cross-bar in engagement at each end with said racks while permitting their rotation, and screw mechanism for operating said cross-bar parallel with the racks, whereby the dimensions of the drums are varied simultaneously to vary the speed between the driving and the driven shaft at will, substantially as specified.

In testimony whereof I have signed my name to this specification in the presence of two subscribing witnesses.

WILLIAM NEWTON DUMARESQ.

Witnesses:
WILLIAM JAS. FERRY,
HARRY A. McLELLAN.